United States Patent [19]

Bahl et al.

[11] Patent Number: 4,852,173
[45] Date of Patent: Jul. 25, 1989

[54] DESIGN AND CONSTRUCTION OF A BINARY-TREE SYSTEM FOR LANGUAGE MODELLING

[75] Inventors: Lalit R. Bahl, Amawalk; Peter F. Brown, New York; Peter V. deSouza; Robert L. Mercer, both of Yorktown Heights, all of N.Y.

[73] Assignee: International Business Machines Corporation, Armonk, N.Y.

[21] Appl. No.: 114,892

[22] Filed: Oct. 29, 1987

[51] Int. Cl.$^4$ .............................................. G10L 9/06
[52] U.S. Cl. ........................................ 381/43; 382/37; 364/513.5
[58] Field of Search .................................. 381/41–43; 364/513, 513.5; 382/37–40

[56] References Cited

U.S. PATENT DOCUMENTS

| | | | |
|---|---|---|---|
| 3,883,847 | 5/1975 | Frank | 340/347 DDX |
| 3,918,047 | 11/1975 | Denes | 340/347 DD |
| 4,466,060 | 8/1984 | Riddle | 364/200 |
| 4,468,728 | 8/1984 | Wang | 364/200 |
| 4,589,142 | 5/1986 | Bednar | 382/47 |
| 4,593,367 | 6/1986 | Slack et al. | 381/43 X |
| 4,654,875 | 3/1987 | Srihari et al. | 382/40 |

OTHER PUBLICATIONS

IBM TDB "Probalistic Character Recognition Decision Trees with Style Variations" vol. 22, No. 10, Mar. 1980, pp. 4420–4422.
IBM TDB "Two–Level Character Recognition Logic" vol. 22, No. 10, Mar. 1980, pp. 4429.
IBM TDB "Two–Level Character Recognition", vol. 23, No. 8, Jan. 1981, pp. 3663–3664.
IBM TDB "Fast Algorithm for Computing the Optimal Linear Combinations of Probability Distributions", vol. 29, No. 5, Oct. 1986, pp. 2347–2348.
*Proceeding of the IEEE*, Nov. 1985, pp. 1549, 1571, 1572, 1610, 1611, 1633, 1639, 1644 and 1645.
Bahl, L. R. et al., "Method for Improving the Fast Match in Continuous Speech," *IBM Technical Disclosure Bulletin*, vol. 27, No. 11, Apr. 1985, pp. 6659–6660.
Barr, A. et al., *The Handbook of Artificial Intelligence*, vol. 1, pp. 80–83 and 349–352, 1981.
Kirkpatrick, S. et al., "Optimization by Simulated Annealing." *Science*, vol. 220, No. 4598, May 13, 1983, pp. 671–680.
Lucassen, J. M. et al., "An Information Theoretic Approach to the Automatic Determination of Phonemic Baseforms." Proc. International Conf. on Acoustics, *Speech and Signal Processing*, 1984, pp. 42.5.1–42.5.4.
Tremblay, J. P. et al., *An Introduction to Data Structures with Applications*, McGraw-Hill, Inc., 1976, pp. 351–357.

*Primary Examiner*—Patrick R. Salce
*Assistant Examiner*—Emanuel Todd Voeltz
*Attorney, Agent, or Firm*—Philip J. Feig; Marc D. Schechter

[57] ABSTRACT

In order to determine a next event based upon available data, a binary decision tree is constructed having true or false questions at each node and a probability distribution of the unknown next event based upon available data at each leaf. Starting at the root of the tree, the construction process proceeds from node-to-node towards a leaf by answering the question at each node encountered and following either the true or false path depending upon the answer. The questions are phrased in terms of the available data and are designed to provide as much information as possible about the next unknown event. The process is particularly useful in speech recognition when the next word to be spoken is determined on the basis of the previously spoken words.

12 Claims, 5 Drawing Sheets

DESIGN AND CONSTRUCTION OF A BINARY-TREE SYSTEM FOR LANGUAGE MODELLING

BACKGROUND OF THE INVENTION

This invention relates to the automatic determination of a rule-based language model for speech recognition and, more specifically, refers to the generation of a decision tree for predicting the next word uttered based upon the previously spoken words.

There are two main approaches to pattern recognition: statistical and syntactic. In the statistical approach, patterns are classified and recognized on the basis of a statistical model, using classical hypothesis testing techniques. In the syntactic approach, rules are defined, often unrelated to statistical theory, in order to recognize a pattern.

In the present invention, rules are determined entirely automatically and are optimal in a well-defined and well-understood sense. The process while resembling an expert system, in fact has no expert.

The pattern recognition problem to be solved by the invention is predicting what word a speaker will say next, based upon the words already spoken. A procedure is disclosed for automatic determination of rules which enable the speaker's next word to be predicted. These rules function the same as the rules of grammar, semantics, and the like, subconsciously invoked by a human listener, but the rules are expressed in a different form.

The article entitled "An Information Theoretic Approach to the Automatic Determination of Phonemic Baseforms" by J. M. Lucassen et al, Proc. Int. Conf. on Acoustics, Speech and Signal Processing, 1984, pp. 42.5.1–42.5.4 describes automatically determined binary-decision trees for determining spelling-to-sound rules for English language words. This technique relies upon the fact that there is a small quantity of letters (26) in the alphabet. The technique cannot be extended to more complex problems such as language modelling where there is a very large quantity of possible words. The present invention differs from the prior approach in the manner of determining the questions, in the manner of terminating the trees and in the method of computing the probability distribution at the leaves of the tree.

While the present invention will most often refer to speech recognition and specifically to next word prediction, the described invention is equally applicable to any pattern recognition system in which a next event or next data predictor is based upon a past event or given set of data. For example, given a list of a patient's medical symptoms, what is the best course of treatment or what is the best diagnosis.

SUMMARY OF THE INVENTION

A decision tree having true or false (i.e., binary) questions at each node and a probability distribution across each leaf is constructed. Commencing at the root of the tree, by answering a question at each node encountered and then following a first or second branch from the node depending upon whether the answer is "true" or "false", progress is made toward a leaf. The question at each node is phrased in terms of the available data (e.g., the words already spoken) and is designed to ensure that the probability distribution at the leaves provide as much information as possible about the next word.

A principal object of the invention is, therefore, the provision of a method of designing and constructing a binary decision tree having true or false questions at each node starting from the root of the tree towards a leaf.

Another object of the invention is the provision of a method of constructing a binary-decision tree using questions phrased in terms of the available known data and designed to ensure that the probability distribution at the leaves maximize the information about the next word.

A further object of the invention is the provision of a method of constructing a binary decision tree primarily for use in speech pattern recognition.

Further and still other objects of the invention will become more clearly apparent when the following description is read in conjunction with the accompanying drawings.

BRIEF DESCRIPTION OF THE DRAWINGS

FIG. 2 illustrates how

DETAILED DESCRIPTION

In order to construct a binary-tree according to the invention, it is necessary to begin with a data set of N discrete variables $X(1), X(2), \ldots, X(N)$ from which it is possible to predict a discrete variable Y. In the example of speech recognition, $X(1) \ldots X(N)$ are the last N words spoken by a speaker and $X(i)$ is the ith word of the most recent N words and Y is the next word to be spoken.

It is assumed that there is a large amount of data available and that it has been divided randomly into approximately equal lists which are referred to as training data and checking data. The training data is used to construct the questions as will be explained hereafter and the checking data is used to verify the efficacy of the questions.

The questions are phrased in the form "is $X(i)$ a member of the set $S(i)$?" The question construction problem is reduced to the task of finding optimal sets $S(i)$ for each one of N variables $X(i)$. There are N sets $S(i)$ for N variables $X(i)$. In the speech recognition problem described, the sets $S(i)$ are lists of words.

Initially, all the data is at the root of the tree to be constructed. Commencing at the root, each node will be split into two descendent nodes until an entire binary tree has been created.

Figure 1:
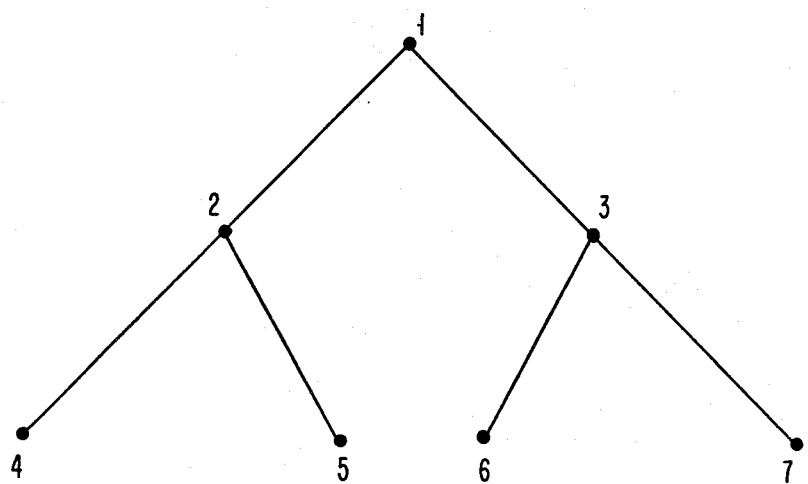
FIG. 1 is a graphic representation of a binary tree.
Figure 2A:
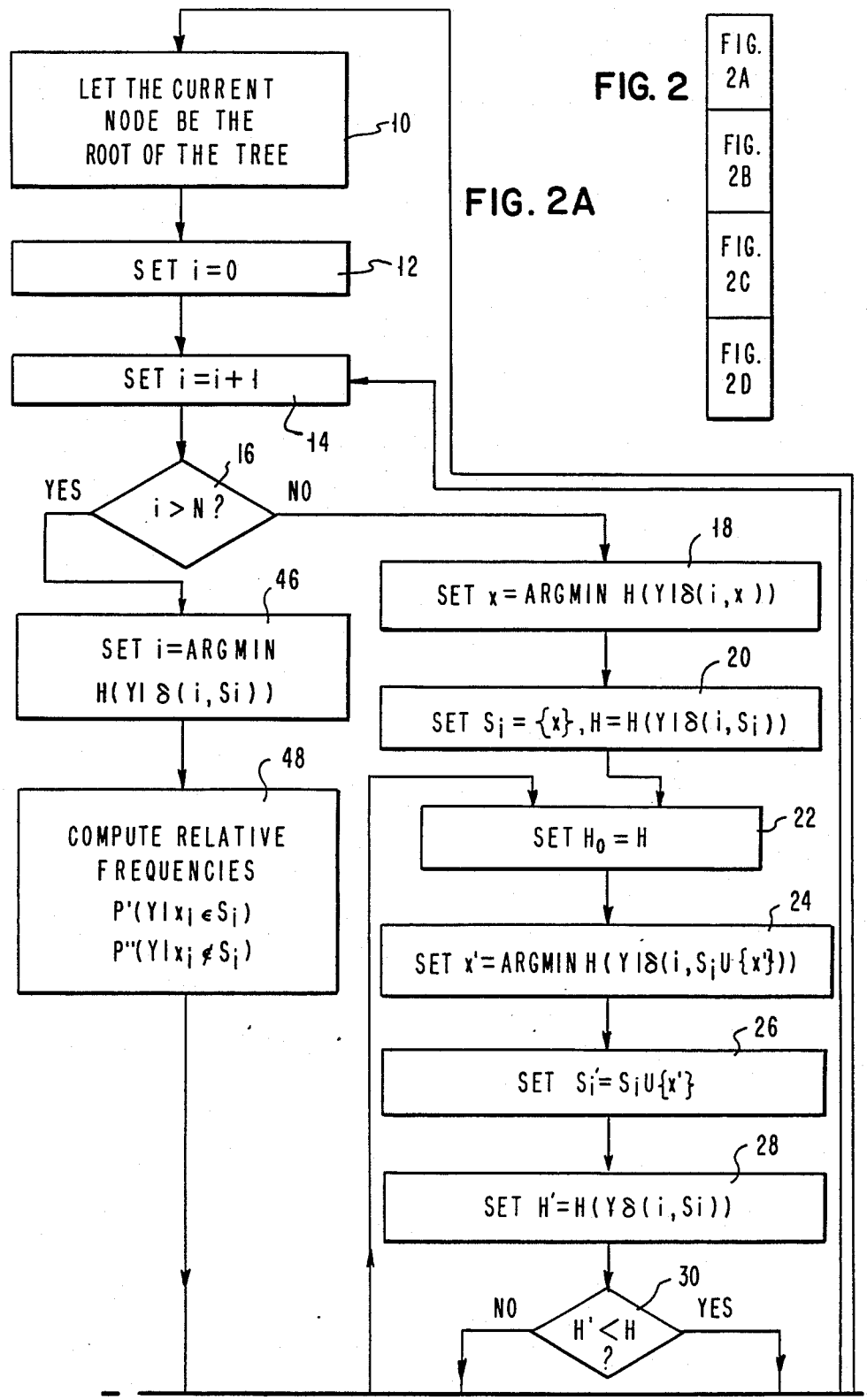
FIGS. 2A, 2B, 2C and 2D are combined so that taken together the figures comprise a flow chart of the procedure according to the invention.
Figure 2B:
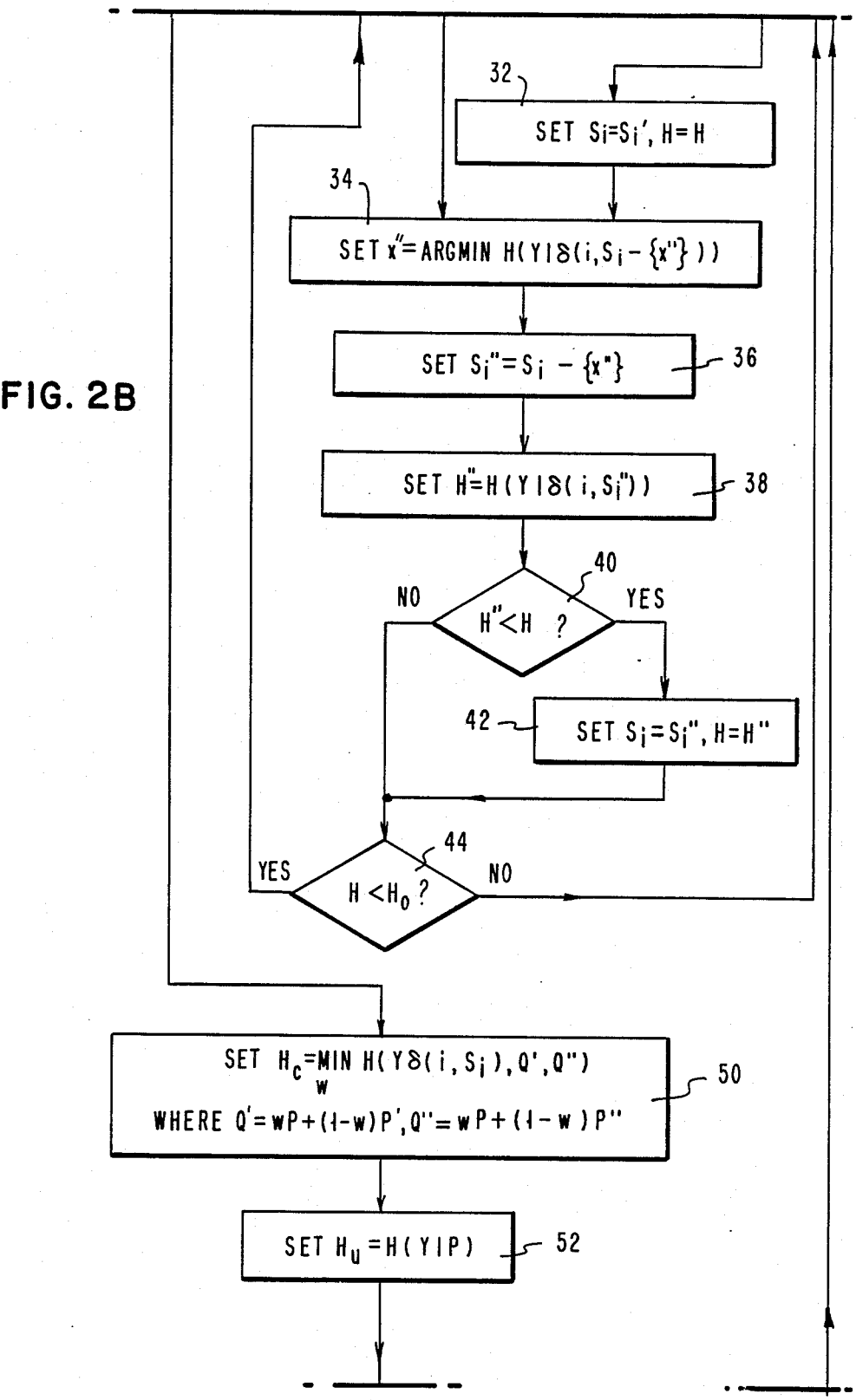
Figure 2C:
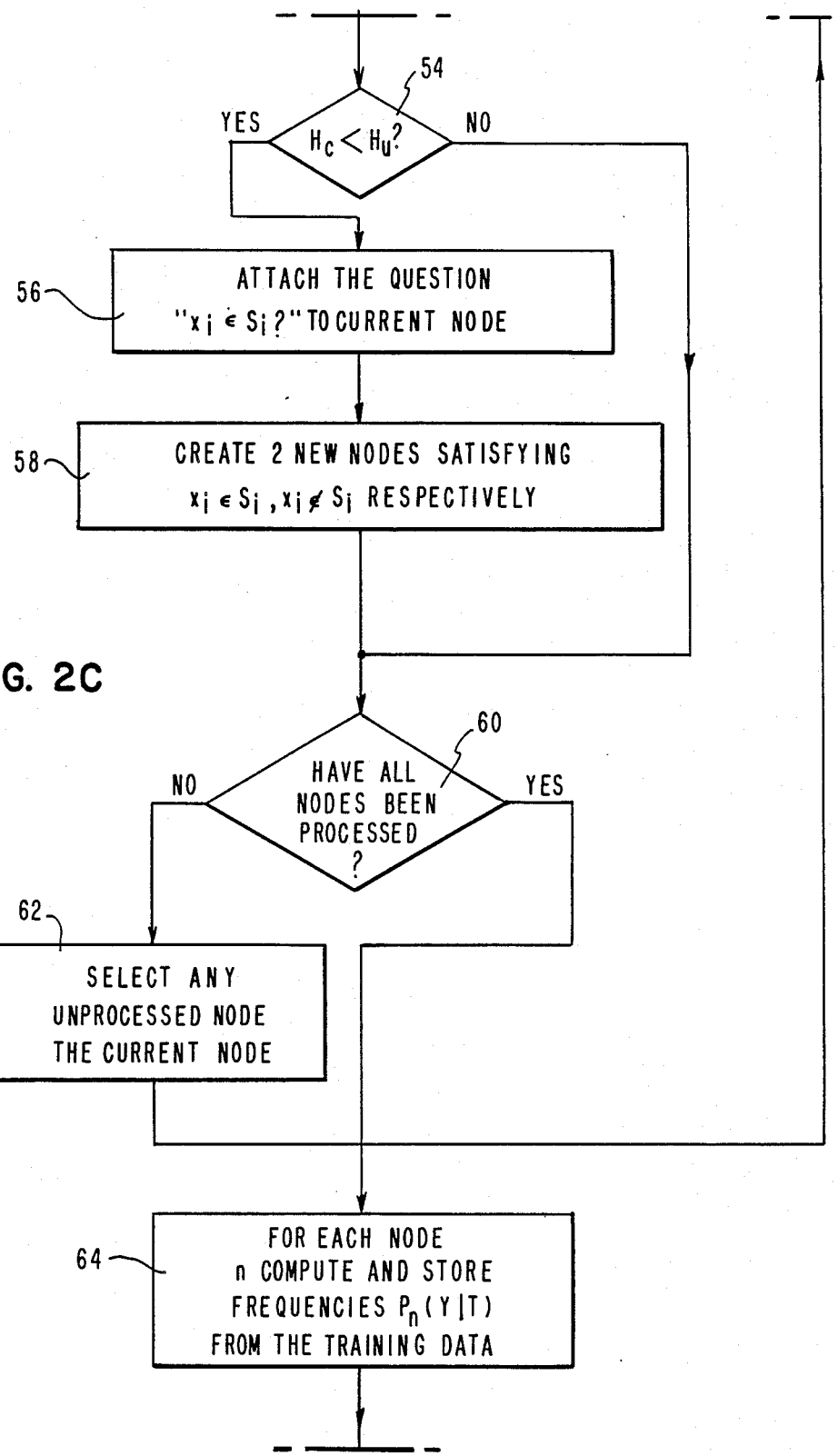
Figure 2D:
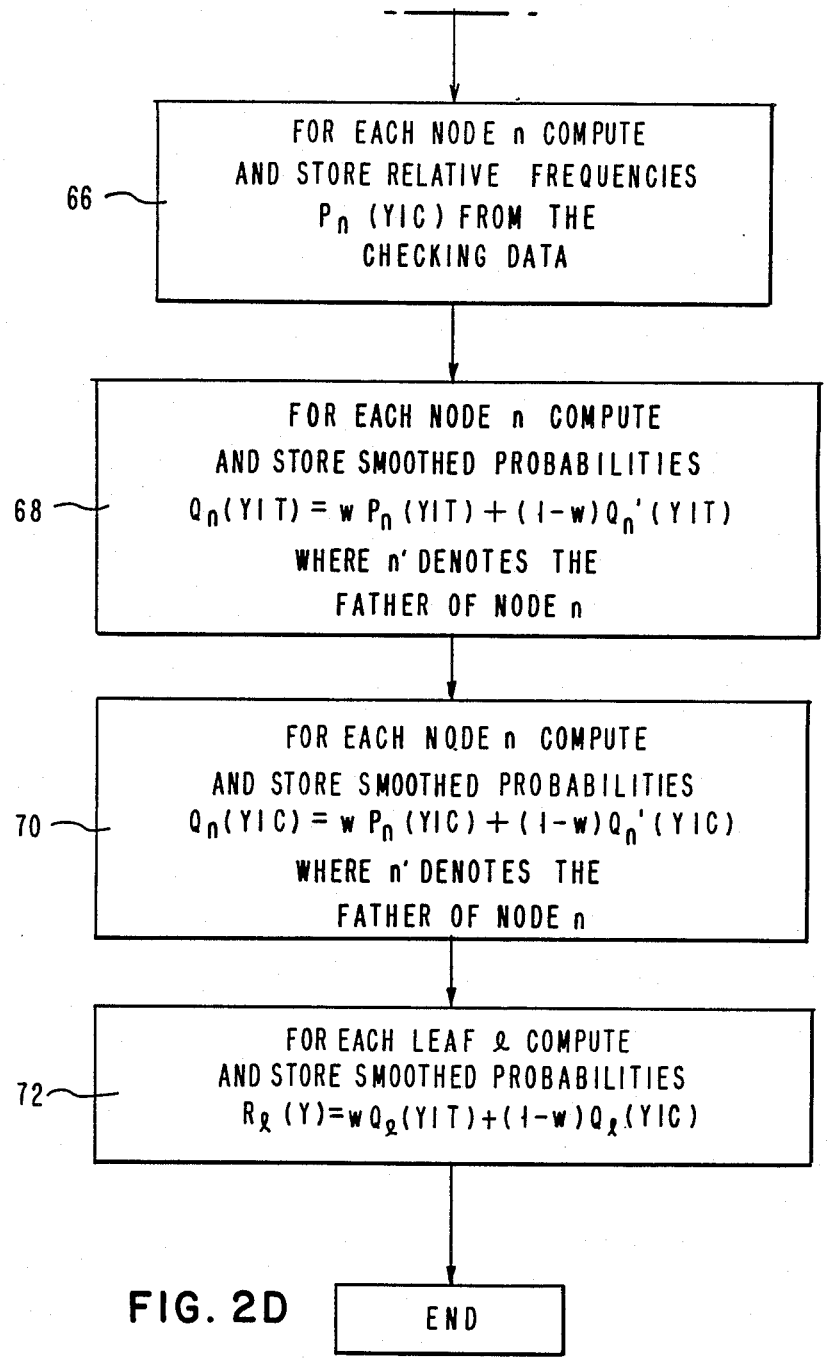

The binary tree is constructed with reference to FIG. 1 by commencing at the root node 1, and splitting the root node into two subnodes 2,3 in order to minimize the average of the entropies of Y at each of the subnodes. The process continues by creating subnodes 4,5 and 6,7 from subnodes 2 and 3, respectively. The criteria used to determine whether to create the subnode is dependent upon only a single operation. Namely, finding a question which when applied to a node, minimizes the entropy of the resulting two subnodes. The question in the case of an unordered variable, such as in speech, is in the form "is X a member of the set S?", where X is one of the last N words spoken and set S is built by adding words to a set in the example of speech modelling. Entropy minimization reduces uncertainty of a decision.

The object is to build a set S for each X such that the question, X∈S, yields as large a reduction in entropy as possible. Initially, the set S is empty, i.e., a null set. In order to find the best word to add to the set S, one word at a time is added to the set, to see which set S results in the greatest reduction in entropy. The process continues until the addition of another word does not reduce entropy. Similarly, words are deleted from set S, if such a deletion reduces the entropy. When the entropy cannot be reduced by either the addition or deletion of another word, the then current list is the selected list. In other words, one word at a time is added to the list and then one word at a time is deleted from the list until the list cannot be increased or decreased without increasing the entropy. The added word may be any word in the vocabulary. Alternatively, groups of words may be added to or deleted from the set S simultaneously, such as all nouns, or days of the week, etc.

For each variable $X_1, X_2, \ldots, X_n$ a set is constructed. For each $X_i$, the best question $Q_i$ of the form $X_i \in \{S_i\}$ using all the data at the root node is determined. The best of the best questions, $Q_1, Q_2, \ldots Q_N$, which produces the greatest entropy reduction, is stored. The node is then split into two subnodes on the basis of the selected question and the process repeats.

For example, if $X_1, X_2, \ldots, X_5$ are the five last words spoken by the speaker, and Y is the next word spoken, and further

| | |
|---|---|
| $Q_1$: $X_1 \in \{a, the, one\}$? | $R_1 = 0.10$ bits |
| $Q_2$: $X_2 \in \{not, none, never, no\}$? | $R_2 = 0.13$ bits |
| $Q_3$: $X_3 \in \{not, none, never, no\}$? | $R_3 = 0.11$ bits |
| $Q_4$: $X_4 \in \{definitely\}$? | $R_4 = 0.02$ bits |
| $Q_5$: $X_5 \in \{once, America, when\}$? | $R_5 = 0.01$ bits | where R is the reduction in entropy. The best question at the node is $Q_2$.

Referring now to FIGS. 2A, 2B, 2C and 2D, there is shown a detailed flow chart of the procedure for practicing the invention. To begin the procedure, let the current node be the root of the tree as indicated in function block 10. To commence construction of the binary tree, the index i is initialized to zero as indicated in function block 12 and then i is set to i+1 as indicated in function block 14. A test is made in decision block 16 to determine if i is greater than N, where N is the quantity of discrete variables (data) from which the next variable is predicted. If i is not greater than N, x is computed in function block 18 in order to minimize the conditional entropy of Y, i.e., $H(Y|\delta(i,x))$, where $\delta(i,x)=1$ if $X(i)=x$, otherwise$=0$.

The entropy, measured in bits, of a discrete random variable Y having n possible outcomes, $y_1, y_2, \ldots y_n$, is defined as:

$$H(Y) = -\sum_{i=1}^{n} Pr(Y = y_i) \log_2 Pr(Y = y_i).$$

If X is another discrete variable having m possible outputs, $x_1, x_2, \ldots x_m$, then the average conditional entropy of Y given X is:

$$H(Y|X) = -\sum_{j=1}^{m} Pr(X = x_j) \sum_{i=1}^{n} Pr(Y = y_i | X = x_j) \log_2 Pr(Y = y_i | X = x_j)$$

Given a sample of data X, an estimate of the conditional entropy $H(Y|X)$ is obtainable by replacing the probabilities by corresponding relative frequencies. This relationship is important as will be described below.

In function block 20, the optimal set, Si, contains the data x and the conditional entropy H is calculated as $H=H(Y|\delta(i,S_i))$. In function block 22, $H_o$ is set equal to H. For all possible outcomes of X(i) which are not contained in Si, it is determined in function block 24 which outcome, x', minimizes the conditional entropy $H'(Y|\delta(i, S_i \cup \{x'\}))$, where $\delta(i, S_i \cup \{x'\})$ is equal to 1 if X(i) is included in the set of $S_i \cup \{x'\}$ and is equal to 0 otherwise.

In function block 26, $S_i'$ is made equal to the union of $S_i$ and $\{x'\}$. In function block 28, the conditional entropy H' is made equal to $H(Y|\delta(i,S_i'))$.

In decision block 30, a decision is made whether H' is less than H. If the result is yes, $S_i$ is made equal to $S_i'$ and H is made equal to H' in function block 32. After performing the function of block 32 or if the result in decision block 30 is no, the outcome x" which minimizes the conditional entropy $H(Y|\delta(i,S_i-\{x''\}))$ is calculated in block 34. Next, in block 36 $S_i''$ is made equal to $S_i-\{x''\}$. In function block 38, the conditional entropy H" is made equal to $H(Y|\delta(i,S_i''))$ and $\delta(i,S_i'')$ is 1 if X(i) is included in the set $S_i''$ and is 0 otherwise.

In decision block 40, a decision is made whether conditional entropy H" is less than conditional entropy H. If yes, then $S_i$ is made equal to $S_i''$ and H is made equal to H" in block 42. After $S_i$ and H are set in block 42 or if the decision in block 40 is no, a decision is made in decision block 44 whether H is less than $H_o$. If the answer is no, i is incremented in block 14 and the procedure repeats. If the answer is yes, $H_o$ is set equal to H in block 22 and the steps in block 24 to 44 are repeated. In other words, the steps in blocks 22 to 44 are repeated until no further reduction in entropy is obtained for the data X(i). That is, the entropy is minimized for the given data or in the case of a speech pattern recognition system for the ith previously spoken word.

Returning to decision block 16, when all the data has been tested and the next i is greater than N, the procedure follows the yes path from decision block 16. In block 46, the value of i which minimizes the entropy $H(Y|\delta(i,S_i))$ previously computed is determined.

Using the training data, two conditional probability distributions are estimated from the relative frequencies in block 48. Namely, $P'(Y|X(i) \notin S(i))$, the probability of Y, given that X(i) is in the set S(i) and $P''(Y|X(i) \in S(i))$, the probability of Y, given that X(i) is not in the set S(i). Hereafter, P(Y) will be referred to as the unconditional probability distribution estimated from the training data.

Next, it is necessary to determine whether the question $X(i) \in S(i)$, whether X(i) is in the optimal set S(i), is genuinely informative, or if it is a spurious peculiarity of the training data. The efficacy of the question is measured empirically by applying the question to the independent checking data.

To this end, smoothed conditional probability distributions must be determined. The conditional probability distributions Q' and Q'' are defined as $$Q'(Y|X(i)\epsilon S(i)) = wP(Y) + (1-w)(P'(Y|X(i)\epsilon S(i))$$

and $$Q''(Y|X(i)\notin S(i)) = wP(Y) + (1-w)(P''(Y|X(i)\notin S(i))$$

In function block 50, the value of w which minimizes the entropy of the checking data using the conditional distributions Q' and Q'' is calculated. The value of w may vary between 0 and 1; however, in practice, varying w in increments of 0.1 steps has proven sufficient for determining a preferred value of w.

The unconditional entropy $H_u$ of the checking data using the unconditional distribution P(Y) is calculated in function block 52. In decision block 54, a determination is made whether the minimum entropy using the smoothed conditional distribution $H_c$ is less than the unconditional entropy of the checking data $H_u$. If yes, the question, whether the data or previous word $X_i$ is in the selected set of data or words $S_i$, is attached to the current node in function block 56. Then, two new nodes satisfying the questions whether $X_i$ is in the set $S_i$ and whether $X_i$ is not in the set $S_i$, respectively are created in block 58. The training data and the checking data are divided into two parts, satisfying the two questions above, thereby creating two new nodes which are descendents of the current (father) node.

Returning to the decision block 54, if the determination is that the smoothed checking data entropy is not less than the unconditional entropy using the unconditional distribution P, or after the two additional nodes are created in block 58, a determination is made in block 60 whether all the nodes have been processed. If the determination is that not all the nodes have been processed, an unprocessed node is selected to be the now current node in block 62 and the process returns to step 10 with the new node being treated as if it were the root of the tree.

When the determination is made in block 60 that all the nodes have been processed, the tree is complete.

In order to determine if a node should be split or left as a leaf, independent checking data is used to verify the efficacy of the question. Any question which does not produce an entropy reduction using the checking data is rejected and the then current node is not subdivided into two new nodes and therefore, it is a leaf of the binary decision tree. The branch of the tree leading to the leaf is complete. Alternatively, if the question reduces entropy, the node is split into one true and one false branch.

When all the nodes have been processed, all branches of the decision tree are complete and an entire binary decision tree has been constructed with entropy reducing questions (i.e., rules) at each node. What remains is the estimates of the probability distributions at each of the leaves. In estimating the probability distribution, there is a requirement for additional data, referred to as held-out data, which is independent of both the training and checking data. The held-out data is used in conjunction with the probability distribution determination as will be explained below.

Applying training and checking data to the tree, where the data includes the next word, results in a distribution at each leaf indicative of the frequency of the occurrence of Y, the next word spoken.

After all the nodes have been processed, the next step in block 64 is that for each node n, a relative frequency $P_n(Y|T)$ is calculated and stored using the relative frequencies of the training data. These probability distributions are referred to as the training probabilities.

Next, for each node n, an unconditional probability distribution is computed and stored in block 66 using the relative frequencies of the checking data. These distributions are referred to as the checking probabilities.

The training probabilities are smoothed in block 68 beginning at the root of the tree and continuing towards the leaves. The smoothed probability using the training data at a node is computed according to the equation $Q_n(Y|T) = wP_n(Y|T) + (1-w)Q_{n'}(Y|T)$ where n' is the father of node n. Each node has its own weight factor w. The symbol $Q_n$ is the smoothed probability associated with the node, $P_n(Y|T)$ is the unsmoothed probability at the same node, and $Q_{n'}(Y|T)$ is the smoothed probability at the father node. The calculated probabilities are stored. At the root node, a uniform probability may be substituted for the father node probability.

The optimal weights, w, for each node may be computed using the held-out data in the manner disclosed in IBM Technical Disclosure Bulletin entitled "Fast Algorithm for Computing the Optimal Linear Combination of Probability Distributions", Vol. 29, No. 5, October 1986, p. 2347.

In function block 70, the checking probabilities are smoothed according to the equation $Q_n(Y|C) = wP_n(Y|C) + (1-w) Q_{n'}(Y|C)$, where n' is the father node. The symbol $Q_n$ refers to the smoothed probability associated with the node n, $P_n$ refers to the unsmoothed probability distribution at the same node n and $Q_{n'}$ refers to the smoothed probability at the father node. The calculated probabilities are stored. At the root node, a uniform probability may be substituted for the father node probability.

At each leaf of the tree, the smoothed probability distribution is calculated according to the formula $R_1(Y) = wQ_1(Y|T) + (1-w)Q_1(Y|C)$, where $R_1$ is the smoothed probability distribution of the leaf, $Q_1(Y|T)$ is the smoothed training probability distribution at the same leaf and $Q_1(Y|C)$ is the smoothed checking probability distribution at the same leaf. The optimal weights, w, may be computed as noted above. The calculated probabilities are stored in block 72.

Traveling from a leaf to the root of the tree, the frequency distribution of a node is the sum of the frequency distributions of the children back to the node. The frequency distribution of each leaf and node divided by the sum of the distribution yields an unsmoothed (frequency distribution normalized) probability. At each leaf there is a probability distribution obtained from all the ancestors, which is a smoothing of data. The binary decision tree is now complete with all probabilities known.

In the case where deterministic predictions are required, rather than the probabilistic results constructed above, the leaf probability distributions may be replaced by the outcome of Y having the highest probability.

Variations and modifications to the procedure described are possible. The sets S(i) are constructed by trying to achieve the best result at each step disregarding global optimization. Each node is split into two subnodes to minimize the average entropy of the two subnodes. An alternative method of constructing the set S(i) is to construct the sets using the methods of stochastic annealing described in the article "Optimization by Simulated Annealing" by S. Kirkpatrick et al, Science, Vol. 220, pp. 671-680, 1983.

The sets S(i) in the preferred procedure are updated by one value at a time, denoted x, x' or x''. The sets can be updated instead by predetermined sets {x}, {x'}, or {x''} each containing one or more members.

The sets S(i) are updated in the present embodiment if the conditional entropy decreases. Alternatively, the sets can be updated only if the entropy decrease is greater than a predetermined threshold value, e.g., 0.01 bits, in order to avoid over training using the training data. Similarly, it is possible to accept a question only if the reduction of entropy in block 54 exceeds a predetermined threshold value.

In an alternative embodiment, if the values of any predictor variable, X(i), can be placed in numerical order and the equations can then be in the form "X(i) < K(i)?" instead of "X(i)∈S(i)?". The values K(i) should be chosen to minimize the conditional entropy as before and may even be determined by a binary search.

While the training and the checking probabilities are smoothed in blocks 68 and 70 by forming weighted linear combinations of the probability distributions specified, it is also possible to smooth the probabilities by using the method described in pending patent application Ser. No. 844,904 filed March 27, 1986.

While there have been described and illustrated a procedure for constructing a binary tree based system for language modelling and several modifications and variations thereof, further modifications and variations may be made without deviating from the scope of the invention which shall be limited solely by the claims appended hereto.

Having thus described our invention, what we claim as new, and desire to secure by Letters Patent is:

1. In a data processing system for determining an unknown event Y, given input data X(1), X(2) ... X(N), a method of constructing a binary decision tree comprising the steps of:
   defining at least one decision node whereat each decision node has two paths each extending to a succeeding node;
   determining a set S(i) for each input datum X(i) by starting with an empty set and adding or deleting one datum item at a time to said set S(i) whenever the changed set reduces the entropy of the unknown event Y;
   structuring a decision question at each decision node based upon the input data and in the form "is X(i) a member of set S(i)"; and
   creating two additional paths if the entropy of the unknown event Y is reduced, or terminating at the decision node if the entropy is not reduced, whereby each terminated decision node is a leaf of the binary decision tree.

2. A data processing system as set forth in claim 1, wherein training data is applied to the tree to calculate the conditional probabilities at each of said nodes in the form $P'(Y|x_i \in S(i))$ and $P''(Y|x_i \notin S(i))$.

3. A data processing system as set forth in claim 2 wherein checking data is applied to the tree to calculate a smoothed conditional probability at each of said nodes in the form $Q'(Y|X(i) \in S(i))$ and $Q''(Y|X(i) \notin S(i))$.

4. A data processing system as set forth in claim 3, wherein a value of w is determined which minimizes the entropy of the checking data according to the formula $H_c = \min H(Y|\delta(\cdot, i), Q', Q'')$.

5. A data processing system as set forth in claim 4 wherein training data is applied to the tree for determining the relative frequency, $P_n(Y|T)$, for each node.

6. A data processing system as set forth in claim 5, wherein checking data is applied to the tree for determining the relative frequency, $P_n(Y|C)$, for each node.

7. A data processing system as set forth in claim 6, wherein the smoothed probability using training data at each node is computed according to the equation $Q_n(Y|T) = wP_n(Y|T) + (1-w)Q_{n'}(Y|T)$, where n' is the father node of the respective node.

8. A data processing system as set forth in claim 7, wherein the smoothed probability using checking data at each node is computed according to the equation $$Q_n(Y|C) = wP_n(Y|C) + (1-w)Q_{n'}(Y|C),$$

where n' is the father node of the respective node.

9. A data processing system as set forth in claim 8, wherein the smoothed probability distribution for each leaf is calculated according to the formula:

$$R_l(Y) = wQ_l(Y|T) + (1-w)Q_l(Y|C).$$

10. A data processing system as set forth in claim 1, wherein said creating two additional paths is performed if the entropy of unknown event Y is reduced by a predetermined threshold value.

11. A data processing system as set forth in claim 1, wherein said set S(i) is added to or deleted from by a plurality of data items whenever the changed set reduces the entropy of the unknown event Y.

12. In a data processing system, the method of constructing a binary-tree sytem for language modelling in speech recognition in which given the N last spoken words, the next word Y is to be determined, comprising the steps of:
   defining at least on decision node whereat each decision node has two paths extending to a succeeding node;
   determining a set S(i) of next words for each of the last i words of the N last spoken words by starting with an empty set and adding or deleting one word at a time to said set S(i) whenever the changed set reduces the entropy of the unknown next word Y;
   structuring a decision question at each decision node in the form "is the ith last spoken word in the set S(i)";
   creating two additional paths if the entropy of the unknown next word is reduced, or terminating at the decision node if the entropy is not reduced;
   determining for each terminated node the smoothed probability of an unknown next word Y; and
   selecting the next word from the probabilities at each terminated node.

* * * * *